United States Patent
Eberlein

(10) Patent No.: US 10,946,832 B2
(45) Date of Patent: Mar. 16, 2021

(54) METHOD AND CONTROL UNIT FOR MONITORING AN INTERIOR OF A MOTOR VEHICLE, IN PARTICULAR DURING A DELIVERY

(71) Applicant: Robert Bosch GmbH, Stuttgart (DE)

(72) Inventor: Matthias Eberlein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/482,873

(22) PCT Filed: Jan. 11, 2018

(86) PCT No.: PCT/EP2018/050628
§ 371 (c)(1),
(2) Date: Aug. 1, 2019

(87) PCT Pub. No.: WO2018/141522
PCT Pub. Date: Aug. 9, 2018

(65) Prior Publication Data
US 2019/0351869 A1 Nov. 21, 2019

(30) Foreign Application Priority Data
Feb. 2, 2017 (DE) .......................... 102017201652.3

(51) Int. Cl.
*B60R 25/20* (2013.01)
*B60R 25/102* (2013.01)
(Continued)

(52) U.S. Cl.
CPC ............ *B60R 25/20* (2013.01); *B60R 25/102* (2013.01); *B60R 25/104* (2013.01);
(Continued)

(58) Field of Classification Search
CPC .......... H04N 5/232; B60R 1/00; B60R 25/20; B60R 25/102; B60R 25/104;
(Continued)

(56) References Cited

U.S. PATENT DOCUMENTS 7,245,207 B1 * 7/2007 Dayan ................. B60R 11/0235
340/435
9,104,537 B1 * 8/2015 Penilla ............... G06Q 30/0643
(Continued)

FOREIGN PATENT DOCUMENTS

| DE | 102014208780 A1 | 11/2015 |
| WO | 2015149910 A1 | 10/2015 |
| WO | 2016188751 A1 | 12/2016 |

OTHER PUBLICATIONS

International Search Report for PCT/EP2018/050628, dated Mar. 22, 2018.

*Primary Examiner* — Nam V Nguyen
(74) *Attorney, Agent, or Firm* — Norton Rose Fulbright US LLP; Gerard Messina

(57) ABSTRACT

A method for monitoring an interior of a motor vehicle using at least one camera directed into the interior during a temporary access to the interior or to a trunk of the motor vehicle, the camera being switched on by a control unit during the entire access or in the event of deviations from specified rules for the access and transmitting the recorded data to a storage device.

6 Claims, 1 Drawing Sheet

(51) Int. Cl.
  *B60R 25/104* (2013.01)
  *B60R 25/30* (2013.01)
  *G07C 9/00* (2020.01)
  *B60R 25/10* (2013.01)

(52) U.S. Cl.
  CPC .......... *B60R 25/302* (2013.01); *B60R 25/305* (2013.01); *G07C 9/00896* (2013.01); *B60R 2025/1013* (2013.01); *G07C 2009/0092* (2013.01)

(58) Field of Classification Search
  CPC ................ B60R 25/302; B60R 25/305; B60R 2025/1013; B60R 2300/404; B60R 2300/406; B60R 2300/50; B60R 2300/8006; B60R 25/00; G06K 9/00791; G07C 9/00896; G07C 2009/0092; G07C 1/32; G06Q 10/0832; G06Q 10/0833
  USPC ....................................................... 340/5.72
  See application file for complete search history.

(56) References Cited

U.S. PATENT DOCUMENTS

| | | | | |
|---|---|---|---|---|
| 9,187,060 | B1* | 11/2015 | Crider | B60R 25/10 |
| 9,862,352 | B2* | 1/2018 | Lortz | B60R 25/00 |
| 10,239,491 | B1* | 3/2019 | Crider | B60R 25/241 |
| 10,460,282 | B2* | 10/2019 | Stark | G06K 19/06037 |
| 2003/0098784 | A1* | 5/2003 | Van Bosch | G08B 21/24 |
| | | | | 340/425.5 |
| 2013/0117078 | A1* | 5/2013 | Weik, III | E05F 15/70 |
| | | | | 705/13 |
| 2015/0070503 | A1* | 3/2015 | Kraeling | H04N 5/23206 |
| | | | | 348/148 |
| 2016/0342943 | A1* | 11/2016 | Wiechers | G07C 9/00309 |
| 2017/0347002 | A1* | 11/2017 | Baker | G06K 9/00832 |

* cited by examiner

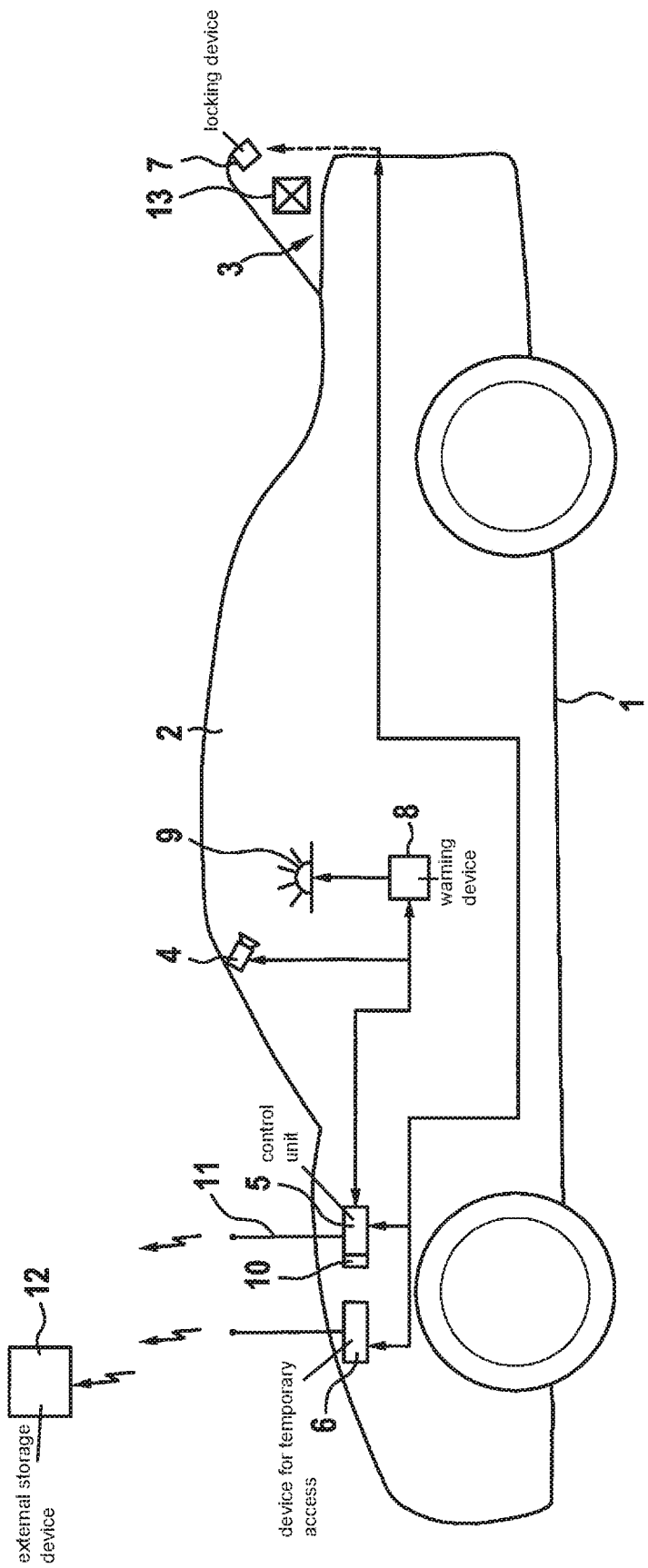

METHOD AND CONTROL UNIT FOR MONITORING AN INTERIOR OF A MOTOR VEHICLE, IN PARTICULAR DURING A DELIVERY

BACKGROUND INFORMATION

In addition to many other delivery routes, delivery services for goods, in particular packages, have developed delivery into an interior or trunk of a motor vehicle. An ever increasing number of motor vehicles are equipped with a locating system so that a delivery service is able to plan and perform the delivery to a motor vehicle using corresponding location data. In addition, however, it is necessary for the delivery service to obtain temporary access to the trunk or interior of the respective vehicle. For this purpose too, corresponding devices have been developed in the meantime, which allow a package delivery service, after identification, to open at least one locking device of the motor vehicle within a specific time period.

PCT Application No. WO 2016/188751 A1, for example, describes a secure system for temporarily allowing access to an interior of a motor vehicle. Although such systems are able to ensure that only an authorized employee of a delivery service obtains access, many owners of motor vehicles have reservations about this type of delivery because there are often personal items in the interior of motor vehicles to which the respective employee of the delivery service (or even a person accompanying this employee) gains access at the same time. Even if only the trunk is opened, many vehicles offer the possibility also to open the interior from there or at least to purloin items from it.

SUMMARY

In order to increase security in a delivery into the interior or trunk of a motor vehicle, the present invention provides an example control unit and an example method. Advantageous refinements and developments are described herein.

In the meantime, many motor vehicles are equipped with an interior monitoring system, which is used to monitor the driver while driving, in particular to determine the driver's alertness (eye monitoring). Cameras may monitor the interior also for other reasons, for example in order to ascertain, prior to an accident, the seating posture of the driver and the front passenger and to initiate safety measures (ignition of airbags, belt tighteners, etc.) correctly. Furthermore, it is only a small expenditure to install a camera for monitoring the interior if none exists for the mentioned reasons.

With the aid of a control unit, which is coupled to a device for temporary access to the interior or the trunk of a vehicle, it is possible to control a camera for monitoring the interior in such a way that it records images during an access. Here there is on the one hand the possibility of recording data generally during the entire time period of a delivery, that is, for as long as the temporary access persists. This ensures that any unauthorized entry into the interior is recorded and therefore has a high preventative effect, at least if the employees of a delivery service are aware of the monitoring. Otherwise, there is at least the possibility of documenting unauthorized entries.

If no recording is to be made for certain reasons (e.g., privacy protection, labor law) in the event of a correct access, the control unit may also be designed in such a way that a second condition must be fulfilled in order to trigger a recording of data during a temporary access. This may be for example the opening of a side door if the delivery has been enabled for the trunk, or the folding down of rear seat backs. Fundamentally, rules may be set up to determine what events are to result in triggering the camera during an access.

For this purpose, to prevent damage by unauthorized entries, it is advantageous if the activation of the camera is announced and/or indicated by an optical and/or acoustic warning signal. Such a warning signal will generally deter an intruder from further unauthorized entries.

A temporary access typically involves radio networks for transmitting location information and access codes so that a motor vehicle having such an access is also equipped with means for transmitting image data to a network and an associated external storage device (cloud). Thus it is possible to store the data recorded by the camera either in the vehicle itself or in an external storage device. It is not possible for an unauthorized intruder subsequently to render an external storage device unusable.

Further details of the present invention and an exemplary embodiment are explained in more detail below with reference to the FIGURE.

BRIEF DESCRIPTION OF THE DRAWING

FIG. 1 schematically shows a motor vehicle equipped for secure delivery.

DETAILED DESCRIPTION OF EXAMPLE EMBODIMENTS

FIG. 1 shows a motor vehicle 1 having an interior 2 and a trunk 3, which is equipped with a locking device 7. A device 6 for temporary access allows an authorized person to open trunk 3 for a specified time in order to deposit for example a delivery 13, in particular a package. A control unit 5 is able to switch on a camera 4 directed into interior 2 for monitoring activities during the temporary access. For this purpose, control unit 5 is coupled to device 6 so that the information as to when a temporary access occurs is available to control unit 5. It is then possible to switch on the camera for the entire duration of the access and record all activities during this time interval. This is also expedient in applications in which a motor vehicle 1 has no separate trunk 3 so that a delivery must be deposited in interior 3. If a complete recording is not desired or not permitted, it is also possible to switch camera 4 on during the access only when certain rules, which may be prescribed for a correct access, are not observed. For example, the camera may be switched on when an access to interior 2 is opened. For preventing unauthorized entries into interior 2, it is particularly effective if a warning device 8 is activated prior to or while switching on camera 4, which triggers an optical and/or acoustic warning signal via a transducer 9. The data recorded by camera 4 may be stored in a storage device 10 in motor vehicle 1 and/or may be stored in an external storage device 12, to which they are transmitted via a radio transmitter 11.

In the latter case, the intruder no longer has access to the data following an unauthorized entry into interior 2.

What is claimed is:

1. An apparatus for monitoring an interior of a motor vehicle having a trunk, which has a locking device, comprising:
    a control unit, for controlling, including switching on, at least one camera in the motor vehicle, and which is coupled to a storage device to record image data during a temporary access; and a device in the motor vehicle for providing temporary access for a specified time to an interior and/or the trunk;

wherein the control unit is coupled to the device, so that information as to when the temporary access for the specified time occurs is providable from the device to the control unit, wherein image data is recorded, in a storage device coupled to the control unit, with the at least one camera during the temporary access of the interior or the trunk of the motor vehicle, and wherein the recorded image data is provided from the camera to the storage device coupled to the control unit, and wherein the control unit is connected to a warning device in the motor vehicle, wherein, when the temporary access has not been authorized, prior to switching on the camera and/or during the operation of the camera, the warning device announces and/or indicates an activation of the camera by a warning signal by an acoustic transducer and/or optical transducer.

2. The apparatus as recited in claim 1, wherein the device is configured for providing the temporary access for depositing a delivery in the interior of the motor vehicle or depositing the delivery in the trunk of the motor vehicle.

3. A method for monitoring an interior of a motor vehicle having a trunk, which has a locking device, the method comprising:

switching on at least one camera, which is directed into an interior of the motor vehicle, by a control unit during a temporary access for a specified time or for deviations from prescribed rules for the temporary access for the specified time;

recording image data, in a storage device coupled to the control unit, with the at least one camera during the temporary access of an interior or the trunk of the motor vehicle;

providing the temporary access for a specified time to the interior and/or the trunk; and providing recorded image data from the camera to the storage device coupled to the control unit;

wherein, when the temporary access has not been authorized, prior to switching on the camera and/or during the operation of the camera, a warning signal is generated by a warning device, the warning signal being an optical and/or acoustic warning signal, and wherein the control unit is connected to the warning device in the motor vehicle, and wherein the warning device announces and/or indicates an activation of the camera by the warning signal by the acoustic transducer and/or the optical transducer.

4. The method as recited in claim 3, further comprising:

granting the temporary access for depositing a delivery in the interior or in the trunk of the motor vehicle; and implementing the temporary access by temporarily opening the locking device of the trunk of the motor vehicle.

5. The method as recited in claim 3, wherein the control unit switches on the camera when the interior or a trunk are opened during the temporary access or when the prescribed rules are not observed.

6. The method as recited in claim 3, wherein the recorded image data are transmitted by the control unit and/or the device to an external storage device via a radio transmitter.

* * * * *